United States Patent
Maruyama

[11] Patent Number: 6,101,035
[45] Date of Patent: Aug. 8, 2000

[54] TRIPLET LENS SYSTEM WITH DIFFRACTIVE LENS FEATURES

[75] Inventor: Koichi Maruyama, Tokyo, Japan

[73] Assignee: Asahi Kogaku Kogyo Kabushiki Kaisha, Tokyo, Japan

[21] Appl. No.: 08/956,643

[22] Filed: Oct. 23, 1997

[30] Foreign Application Priority Data

Oct. 24, 1996 [JP] Japan .................................. 8-300947

[51] Int. Cl.[7] .............................. G02B 27/44; G02B 9/14
[52] U.S. Cl. .......................... 359/565; 359/558; 359/570; 359/785
[58] Field of Search ...................... 359/565, 569, 359/785, 786, 787, 788, 789, 790, 16, 19, 570, 558, 571, 742, 743

[56] References Cited

U.S. PATENT DOCUMENTS

| | | | |
|---|---|---|---|
| 3,022,708 | 2/1962 | Baker ........................................ | 359/785 |
| 4,105,308 | 8/1978 | Owen, Jr. et al. ...................... | 359/785 |
| 5,013,133 | 5/1991 | Buralli et al. ........................... | 359/565 |
| 5,044,706 | 9/1991 | Chen ........................................ | 359/357 |
| 5,148,314 | 9/1992 | Chen ........................................ | 359/565 |
| 5,151,823 | 9/1992 | Chen ........................................ | 359/565 |
| 5,581,405 | 12/1996 | Meyers et al. .......................... | 359/569 |
| 5,636,065 | 6/1997 | Takato ..................................... | 359/785 |
| 5,691,847 | 11/1997 | Chen ........................................ | 359/565 |
| 5,715,090 | 2/1998 | Meyers .................................... | 359/565 |
| 5,838,497 | 11/1998 | Maruyama .............................. | 359/565 |

FOREIGN PATENT DOCUMENTS

| | | | |
|---|---|---|---|
| 3015858 | 11/1980 | Germany ................................ | 359/785 |
| 0914835 | 1/1963 | United Kingdom ................... | 359/785 |

OTHER PUBLICATIONS

G.J. Swanson, "Binary Optics: The THeory and Design of Multi–Level Diffractive Optical Elements", Technical REport 854, Massachusetts Inst. Tech., Lincoln Laboratory, pp. 1–47, Aug. 1989.

A.P. Wood, "Design of Infrared Hybrid Refractive–Diffractive Lenses", Applied Optics, vol. 31, No. 13, pp. 2253–2258, May 1992.

Hiroyuki Ichikawa, "Aberration Properties of Diffractive Triplets", SPIE vol. 2778 Optics for Science and New Technology (1996), pp. 83–84, Aug. 1996.

*Primary Examiner*—Cassandra Spyrou
*Assistant Examiner*—John Juba, Jr.
*Attorney, Agent, or Firm*—Greenblum & Bernstein P.L.C.

[57] ABSTRACT

A triplet lens system composed of a first positive lens element, a second negative lens element and a third positive lens element. At least one lens surface is provided with a blazed zonal structure having a function of a positive diffractive lens.

8 Claims, 9 Drawing Sheets

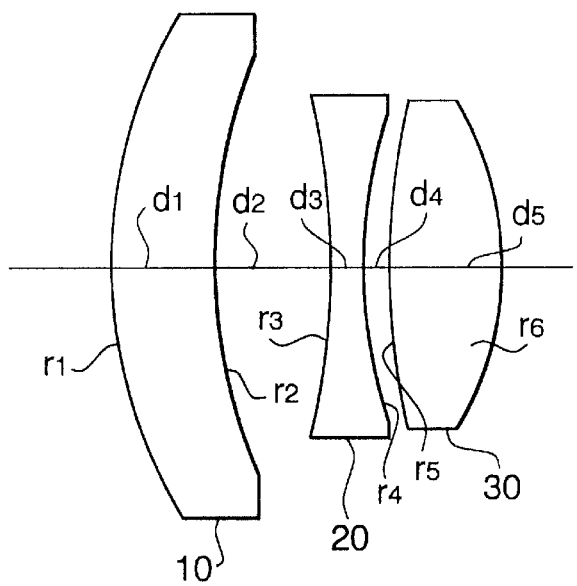
FIG.3
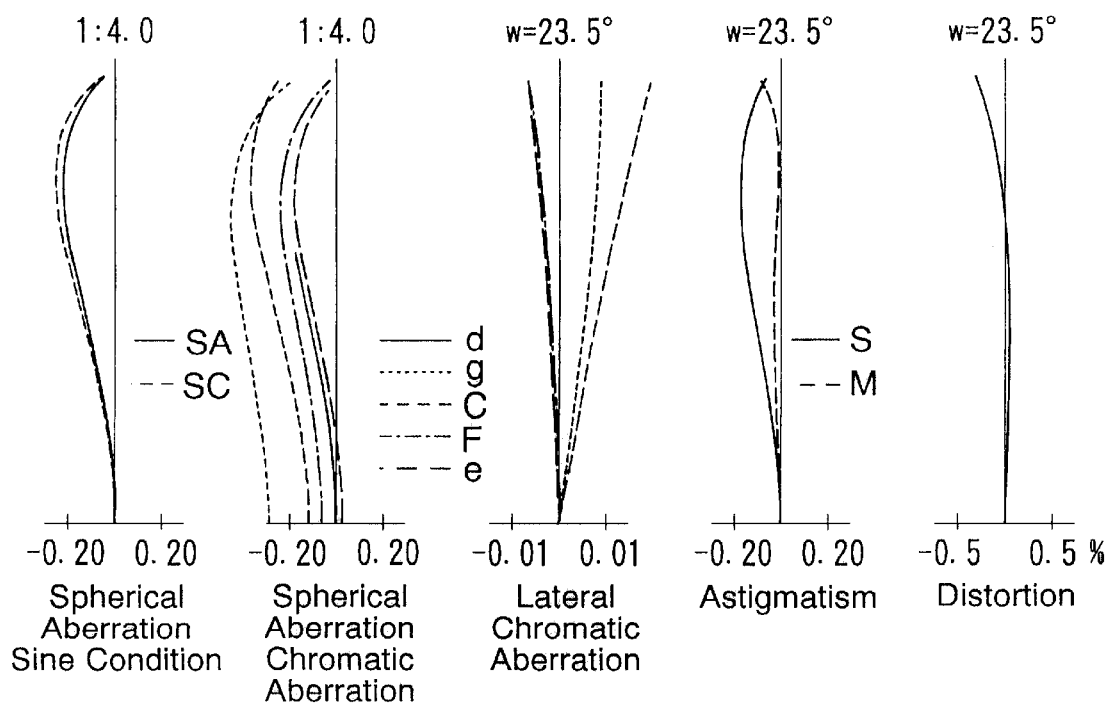

FIG.5
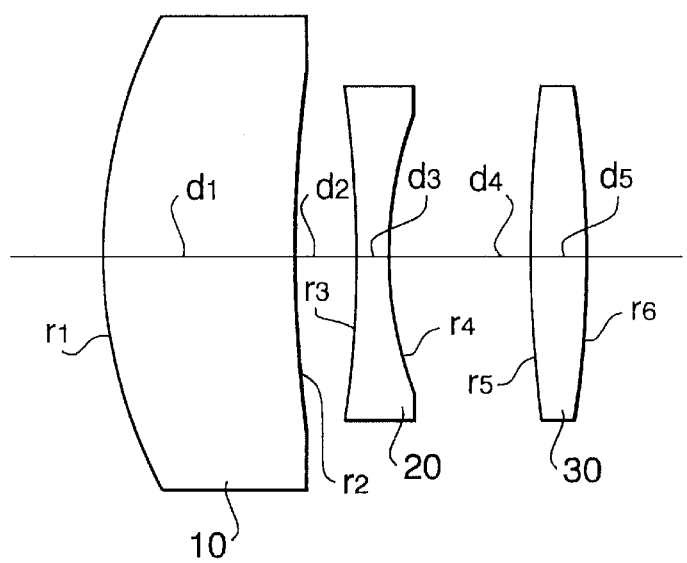
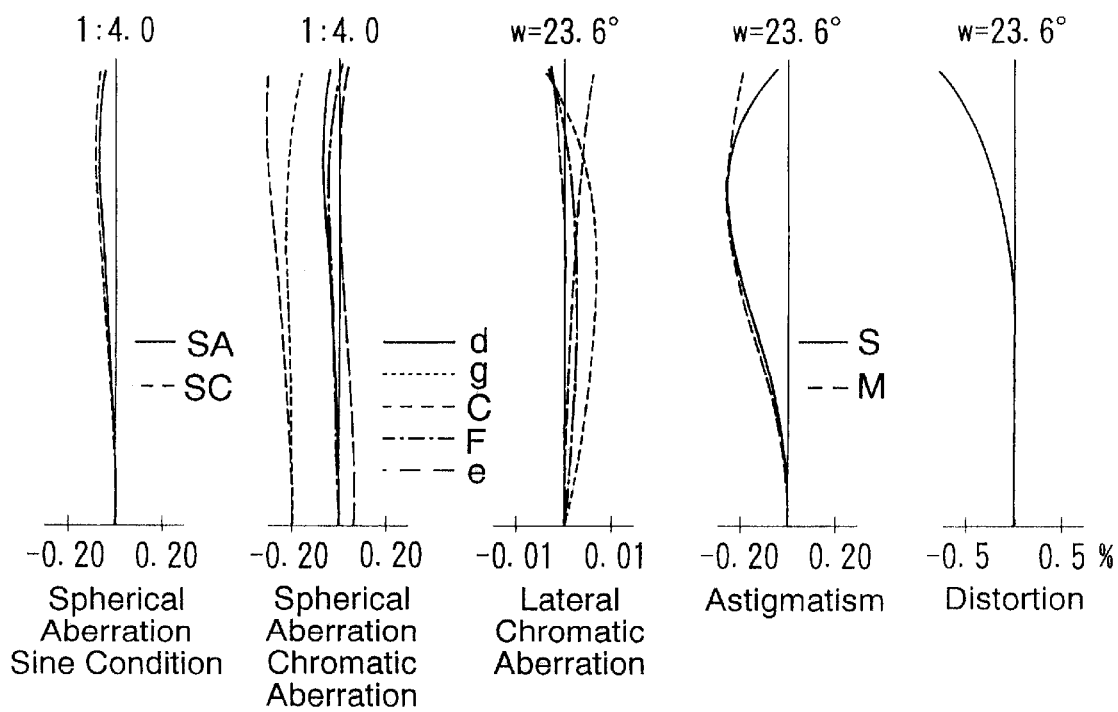

FIG.7
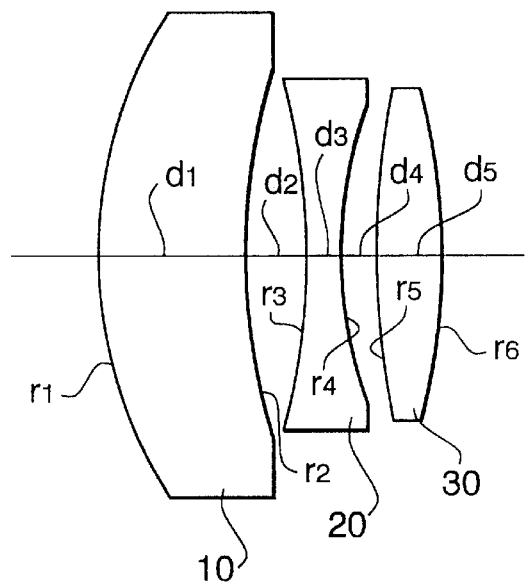
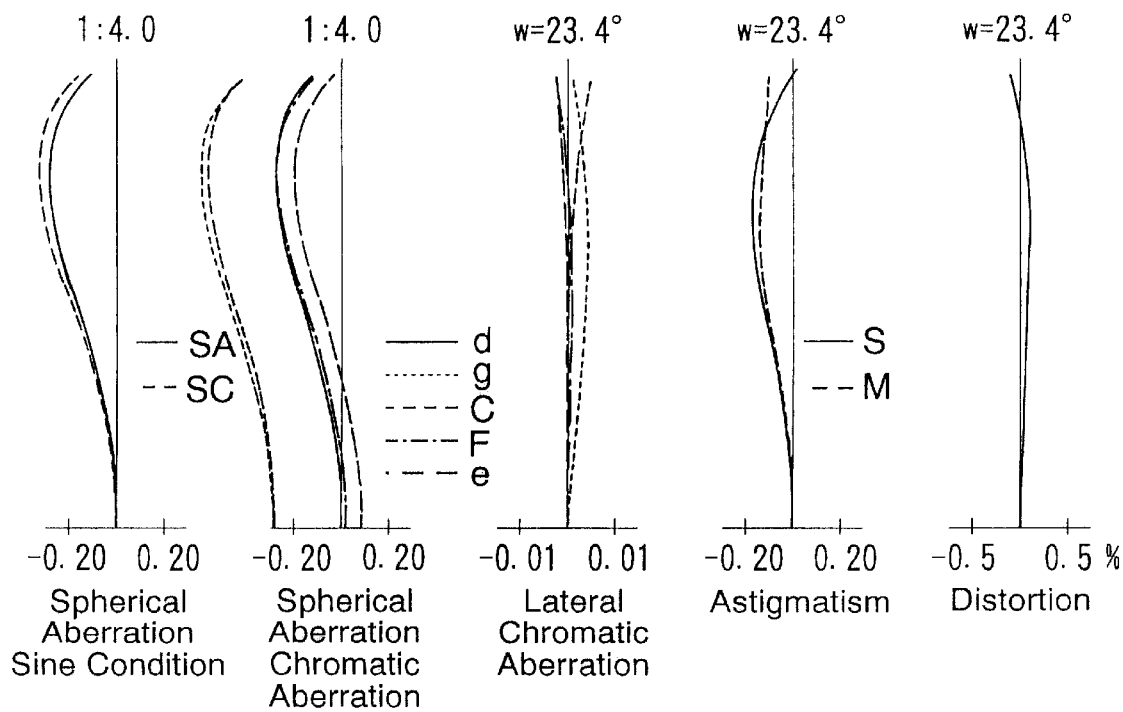

FIG.15
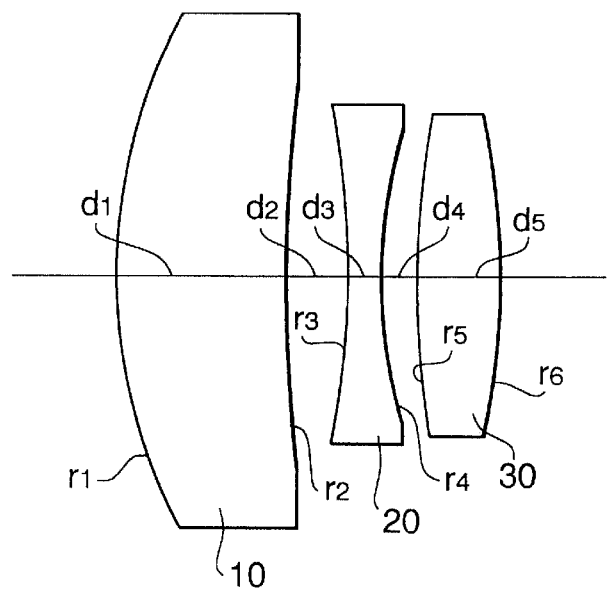
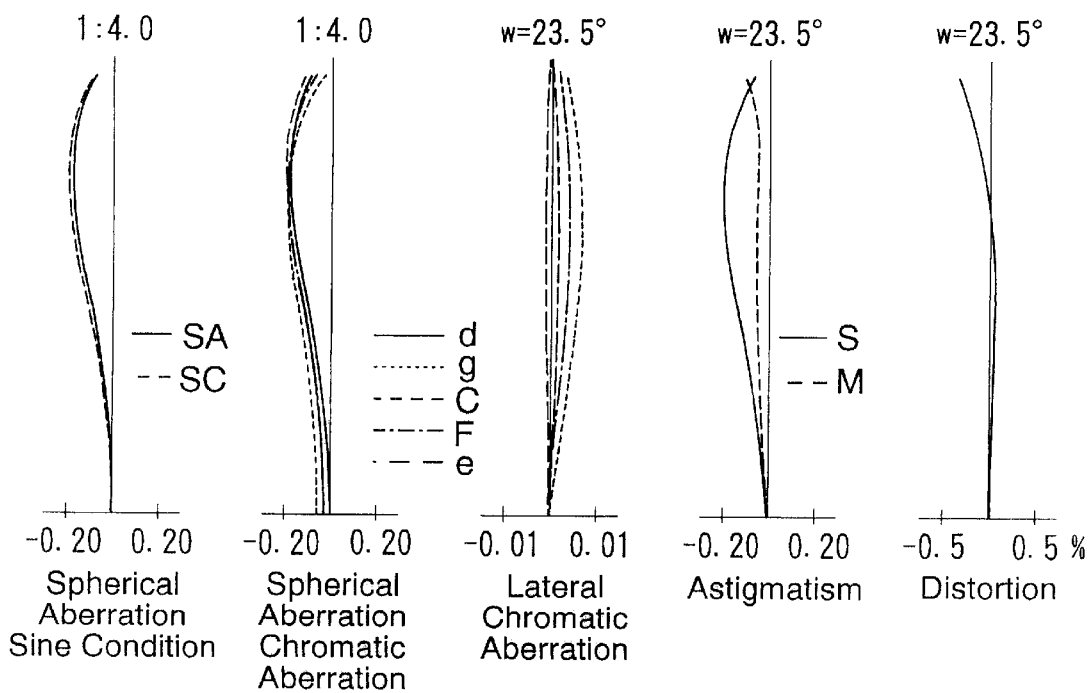
FIG.16A  FIG.16B  FIG.16C  FIG.16D  FIG.16E

TRIPLET LENS SYSTEM WITH DIFFRACTIVE LENS FEATURES

BACKGROUND OF THE INVENTION

The present invention relates to a triplet lens system which is composed of three lens elements, i.e., a positive lens element, a negative lens element and a positive lens element.

It is generally known that in a triplet lens system which is composed only of three lens elements, it is difficult to correct various types of aberrations with good balance and in particular to achieve a Petzval's sum of nearly zero. Conventionally, the triplet lens systems are generally designed to reduce influences of curvature of field by making a meridional image plane and a sagittal image plane to be substantially planar surfaces by utilizing astigmatism.

When the triplet lens system is designed to correct the influences due to a curvature of field by utilizing astigmatism, however, with respect to off-axial rays, a region where sufficient resolution is obtained in both the meridional and sagittal directions is narrowed. Therefore, an allowable range in which tilting of an image plane is allowable should be narrow, and high precision is required for manufacturing and assembling such a lens system, and a working efficiency is lowered accordingly. Further, such a triplet lens system requires highly precise focusing when in use, and accordingly is difficult to handle.

SUMMARY OF THE INVENTION

In view of the problems described above, it is an object of the invention to provide an improved triplet lens system which is capable of suppressing an astigmatism and curvature of field at low levels, has large allowable ranges in manufacturing and use, and therefore can be handled easily.

For the above object, according to the invention, there is provided a triplet lens system which is provided with a blazed zonal structure having a function of a positive diffractive lens on one of the lens surfaces in the triplet lens system composed of three lens elements: a positive lens element, a negative lens element, and another positive lens element.

In contrast to an ordinary lens element which has a characteristic that it produces curvature of field whose curvature has a Petzval's sum P determined as $P = \Sigma \phi/n$, wherein a reference symbol n represents a refractive index, and a reference symbol $\phi$ represents a power of a surface. A diffractive lens has a characteristic such that it does not produce a curvature of field regardless of a power of the lens. Accordingly, it is possible to make a Petzval's sum nearly equal to 0, and to reduce both astigmatism and curvature of field, by imparting a positive power to a diffraction lens element so as to weaken positive powers of the positive lens elements or strengthening the power of the negative lens element.

When a positive power can be imparted to a diffraction lens element, for example by +0.1, it is possible to shift the power of the negative lens element by −0.1 in the negative direction. In this case, a change of a Petzval's sum is −0.0625 on an assumption that the negative lens element has a refractive index of 1.6. Since an approximate Petzval's sum of a triplet lens system is generally 0.3, the Petzval's sum can be made to zero by shifting the power of the negative lens element by approximately −0.5 at maximum in the negative direction. When the negative power of the negative lens element, however, is strengthened excessively, spherical aberration of high orders is produced and darkens the lens system or astigmatism of high orders is produced and narrows an angle of view within which favorable optical performance can be obtained. Further, a diffractive lens produces chromatic aberration and cannot have a strong power when it is to be used within a broad wavelength range.

On the other hand, an image plane which is sufficiently flat for practical use is obtainable as far as a Petzval's sum can be corrected within a range from approximately 0.10 to 0.25 by undercorrecting spherical aberration. It is therefore desirable that the diffractive lens has a power ratio which satisfies the following condition (1):

$$0.03 < (f/fD) < 0.25 \tag{1}$$

wherein the reference symbol f represents a focal length of a triplet lens system as a whole, and the reference symbol fD designates a focal length of the diffractive lens.

If the power ratio is lower than the lower limit of the condition (1), the diffractive lens may have an insufficient power, and is unable to compensate the curvature of field sufficiently. If the power ratio exceeds the upper limit of the condition (1), optical performance will be degraded due to astigmatism of high orders.

When a diffractive lens (or a molding die therefor) is to be manufactured with a super precision lathe, cutting or manufacturing difficulty remains quite unchanged between a case where a diffractive lens structure has only power components expressed by a quadratic formula and a case where the structure has other components of higher orders. It is preferable that the structure has an aspherical component of the fourth order in a direction to cancel variations of spherical aberration caused due to variations of wavelengths. Since a triplet lens system generally tends to undercorrect spherical aberration at long wavelengths, it is possible to suppress production of spherical aberration by adopting a negative component of the fourth order for a diffractive lens so as to over-compensate spherical aberration at the long wavelengths.

In a case of a lens system which requires flat image plane, marginal rays may be required in most cases and it is preferable for these lens systems to select a lens type in which an aperture stop is disposed after a second lens element, and it is desirable for favorably compensating for the lateral chromatic aberration to satisfy the following condition (2):

$$1/\nu1 < 1/\nu3 \tag{2}$$

wherein the reference symbol $\nu1$ represents an Abbe's number of a first lens element and the reference symbol $\nu3$ designates an Abbe's number of a third lens element.

A diffractive lens structure may be formed on any lens element. When a diffractive lens is used as the first lens element, however, an equivalent Abbe's number $\nu$ is used as the Abbe's number $\nu1$ of the first lens element in the above-mentioned inequality (2) since it is possible to compensate lateral chromatic aberration as far as a total amount of chromatic aberration is small even when a material of the first lens element is highly dispersive. It is assumed in this case that the following relationship is applicable.

$$\phi r/\nu1 + \phi D/\nu D = \phi 1/\nu$$

wherein the reference symbol $\phi r$ represents a power of the first lens element considered as a refractive lens element, the reference symbol φD designates a power of the diffractive lens, the reference symbol ν1 denotes an Abbe's number of the first lens element, the reference symbol νD represents an Abbe's number of the diffractive lens=−3.453 and the reference symbol φ1 designates a power of the first lens element as a whole.

When the zonal structure is to be formed on a surface of the first lens element which is located on a side of the second lens element, it is desirable for lowering-heights of incidence of marginal rays to satisfy the following condition (3):

$$0.10 < d1/f \qquad (3)$$

where the reference symbol d1 represents a thickness of the first lens element, and the reference symbol f represents a focal length of a triplet lens system as a whole.

For manufacturing a lens element which has a blazed fine structure by molding with a die which is worked with a super precise lathe, it is preferable to select a resin which has a low refractive index and is lowly dispersive for the second lens element since it is difficult to work a die so as to form the diffraction structure on a glass material. PMKA, ZEONEX (a trade name of a product of Nippon zeon Co., Ltd.), APEL (a trade name of a product of Mitsui Petrochemical Industries, Ltd.) and so on can be mentioned as resins which have such low refractive indices and are lowly dispersive.

When a diffractive lens is to be disposed as the second lens element, it is desirable to satisfy the following conditions (4) and (5):

$$\nu2 \geq \nu1 \geq \nu3 \qquad (4)$$

$$0.75 < hD/h1 < 0.88 \qquad (5)$$

wherein the reference symbol ν1 represents an Abbe's number of the first lens element, the reference symbol ν2 designates an Abbe's number of the second lens element, the reference symbol ν3 denotes an Abbe's number of the third lens element, the reference symbol h1 represents a height of incidence of a paraxial marginal ray on the first lens element and the reference symbol hD designates a height of incidence of the paraxial marginal ray on a surface on which the zonal structure is formed.

If the height of incidence of the paraxial marginal ray is lower than the lower limit of the condition (5), aberrations of high orders will be produced, thereby undesirablly limiting brightness of the lens system. When the condition (5) is satisfied, the height of incidence on the second lens element is lowered and a strong power can be imparted with an amount of chromatic aberration kept unchanged, thereby making it possible to correct curvature of field favorably. Further, it is also possible to correct longitudinal chromatic aberration and lateral chromatic aberration favorably since the second lens element is located in the middle of the lens system. It is therefore desirable to dispose a diffraction lens element on the second lens element. For making it possible to impart a power to the diffractive lens, it is preferable to select for the second lens element an Abbes number which is larger than that of the first positive lens element and that of the third positive lens element, thereby lowering a chromatic aberration correcting function of the second lens element as the diffractive lens as in the condition (4).

When the second lens element is made of a resin and a surface of the second lens element has a zonal structure which functions as a blazed positive refraction lens element, it is possible to obtain an image plane which is sufficiently flat for practical use so far as a Petzval's sum can be corrected to approximately 0.10 to 0.25. For this purpose, it is desirable that the diffraction lens element has a power ratio satisfying the following condition (6):

$$0.07 < (f/fD) < 0.25 \qquad (6)$$

wherein the reference symbol f represents a focal length of the triplet lens system as a whole and the reference symbol fD designates a focal length of the diffractive lens.

If the power ration of the diffraction lens is lower than the lower limit of the condition (6), the diffraction lens element does not have a sufficient power, and may be unable to correct curvature of field sufficiently. If the power ratio is greater than the upper limit, astigmatism of high orders may degrade optical performance as described above.

BRIEF DESCRIPTION OF THE ACCOMPANYING DRAWINGS

FIG. 3 is a sectional view illustrating a structure of a second embodiment of the triplet lens system according to the present invention;

FIGS. 4A–4E show graphs illustrating aberrations produced in the second embodiment of the present invention;

FIG. 5 is a sectional view illustrating a structure of a third embodiment of the triplet lens system according to the present invention;

FIGS. 6A–6E show graphs illustrating aberrations produced in the third embodiment of the present invention;

FIG. 7 is a sectional view illustrating a structure of a fourth embodiment of the triplet lens system according to the present invention;

FIGS. 8A–8E show graphs illustrating aberrations produced in the fourth embodiment of the present invention;

FIG. 15 is a sectional view illustrating a structure of an eighth embodiment of the triplet lens system according to the present invention;

FIGS. 16A–16E show graphs visualizing aberrations produced in the eighth embodiment of the present invention;

DESCRIPTION OF THE EMBODIMENTS

Figure 1:
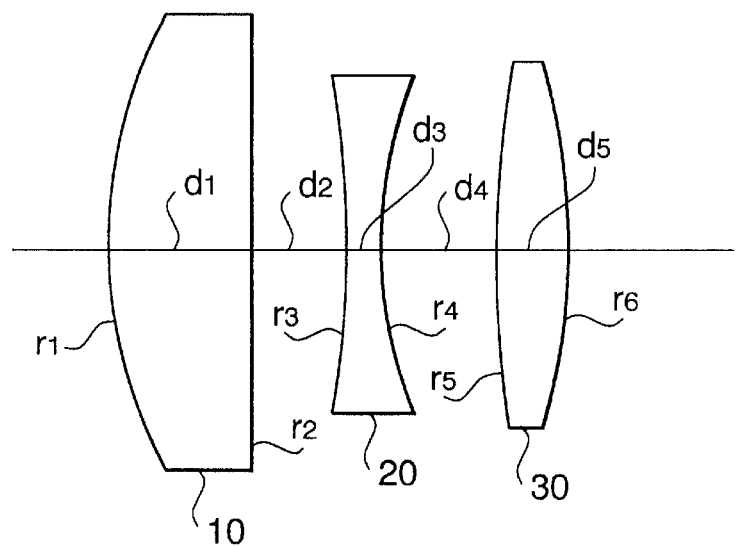
FIG. 1 is a sectional view illustrating a structure of a first embodiment of the triplet lens system according to the present invention.

Embodiments of the triplet lens system according to the present invention will now be described with reference to the accompanying drawings. In each embodiment, a triplet lens system is composed, as shown in FIG. 1 for example, of a first positive lens element 10, a second negative lens element 20 and a third positive lens element 30 in order from the object side which is the left-hand side in the drawing. It should be noted that the same reference numerals are used for the lens elements 10, 20, and 30, and their surfaces r1–r6, even for different embodiments.

For reducing the Petzval's sum, it is preferable to use a material having a low refractive index for the negative lens element, and a material having a high refractive index for the positive lens elements. When it is unnecessary to consider chromatic aberration, i.e., in a case where the triplet lens system is to be used in an optical system which uses a light source emitting a monochromatic light beam such as a laser beam, high-dispersive lens elements which may have a high refractive index relatively inexpensively can be used as the positive lens elements, and a low-dispersive lens element can be used as the negative lens element for lowering a refractive index of the negative lens element. Such lens elements can also be used in a case where a light source such as an LED which has a narrow wavelength range is used, or a wavelength range is narrowed by a filter.

When the triplet lens system is to be used in an optical system using a white light-beam or the like which has a broad wavelength range, however, lens materials must be selected with taking a secondary spectrum into consideration. Generally, partial dispersion ratios θgF of glass materials have high ratios if the glass materials have high refractive indices and are highly dispersive, whereas partial dispersion ratios θgF of glass materials have low ratios if the glass materials have low refractive indices and low dispersion. Accordingly, correction of chromatic aberration causes a total power to weaken for wavelengths outside the wavelengths at which chromatic aberration is corrected, and prolongs a back focal length for the wavelengths outside the corrected wavelengths.

When, on the other hand, chromatic aberration is corrected using a diffractive lens, chromatic aberration remains in a direction opposite to the aberration caused only when the refractive lens elements are used. A super-achromatic lens system may be designed by canceling both chromatic aberrations with each other. When an excessive function for correcting chromatic aberration is imposed on a diffraction lens element, however, a secondary spectrum is enlarged and contrast is lowered in a case where a wavelength range is broad since the diffractive lens has a partial dispersion which is remarkably extraordinary. It is therefore preferable to use a glass material which has low dispersion and has a low partial dispersion ratio θgF for the positive lens elements, and a glass material which has high dispersion and has a high partial dispersion ratio θgF for the negative lens element. Though the glass material for the positive lens elements which has the high refractive index and low dispersion has the low partial dispersion ratio θgF, the glass material for the negative lens elements has the high reflective index and high dispersion, when the partial dispersion ratio θgF is high.

If the wavelength range in which the triplet lens system is used is relatively wide, it is necessary to select a glass material which has a higher dispersing power and a higher refractive index, whereby the diffractive lens has a weaker power and the Petzval's sum may not be made sufficiently small. When the triplet lens system is to be used with a light source which emits a light beam having a broad wavelength range, it is therefore necessary to dispose a diffractive lens structure at a location at which it produces chromatic aberration in an amount as small as possible. Since an amount of an axial chromatic aberration is proportional to a square of a height of incidence of a paraxial marginal ray, it is preferable to dispose a diffractive lens structure on a surface on which a height of incidence of the paraxial marginal ray is low.

When a diffractive lens structure is formed on a surface of the first lens element which is located on the second lens element side (i.e., on a second surface), it is preferable to make the first lens element thicker so as to lower the height of incidence of the paraxial marginal ray on the second surface. Curvature of field can be corrected as well, since the height of incidence of the paraxial marginal ray is lowered on the surface of the second lens element which is as located on a first lens element side (i.e., a third surface) and a strong power can be distributed to the diffractive lens while suppressing production of chromatic aberration. Further, the longitudinal and lateral chromatic aberration can be corrected well since the third surface is located in the middle of the triplet lens system as a whole.

When a diffractive lens structure is disposed on a surface of the second lens element located on the third lens element side (i.e., a fourth surface), aberrations can be corrected favorably, as in the case where the diffractive lens is disposed on the third surface. In a lens system which produces little vignetting, however, rays emerge at large angles from marginal portions, and phases may not match between an axial ray and an offaxial ray.

Furthermore, it is possible to compensate both longitudinal and lateral chromatic aberrations even when all the lens elements are made of the same material. In such a case, however, a manufacturing cost is remarkably lowered, but the lens system has a low refractive index and can hardly-correct curvature of field completely. Accordingly, it is preferable to use a material which has a high refractive power at least for the first lens element and the third lens element.

Hereinafter, nine embodiments of the triplet lens system according to the present invention will be described in detail.

In the first and third embodiments, a diffractive lens structure is formed on the fourth surface.

In the second embodiment, the diffractive lens structure is formed on a first surface.

In the fourth, fifth, seventh and eighth embodiments, the diffractive lens structure is formed on a third surface.

In the sixth and ninth embodiments, the diffractive lens structure is formed on a second surface.

The tables below list numerical data, and marks "*" indicate surfaces on which the diffractive lenses are formed. At least a second lens element 20 is made of resin in the first, third, fourth and fifth embodiments, and particularly in the first embodiment, all lens elements are made of resin.

First Embodiment

FIG. 1 is a sectional view illustrating a concrete structure of the first embodiment, whose concrete numerical data is listed in Table 1. In-the drawing and the table, reference symbol FNO. represents an F number, reference symbol f designates a focal length, reference symbol ω denotes half of an angle of view, reference symbol fB represents a back focal length, reference symbol r denotes a radius of curvature of each surface of the lens elements, reference symbol d denotes a lens thickness of a lens element or an space between lens elements, reference symbol n represents a refractive index of a lens element for the d-line (588 nm), and reference symbol ν designates an Abbe's number of a lens element.

In the first embodiment, the first, third and fifth surfaces are configured as rotationally symmetrical aspherical surfaces. The aspherical surface is expressed by formula (1), which is shown below:

$$X = CY^2 / \left(1 + \sqrt{(1-(1+K)C^2Y^2)}\right) + A4Y^4 + A6Y^6 \qquad (1)$$

wherein reference symbol X represents a distance (sag) as measured from a tangential plane on a point where the optical axis intersects the aspherical surface of the lens, to a point on the aspherical surface which has a height Y from the optical axis, reference symbol C designates curvature (1/r) of the aspherical surface on the optical axis, reference symbol K denotes a conical coefficient, and reference symbols A4 and A6 represent aspherical surface coefficients of the fourth order and the sixth order, respectively. In Table 1, radii of curvature of the aspherical surfaces are represented as those on the optical axis, and conical coefficients and aspherical surface coefficients of these surfaces are listed in Table 2.

[TABLE 1]

Fno. 1: 3.5 f = 50.00 ω = 23.6° fB = 40.77

| Surface No. | r | d | n | ν |
|---|---|---|---|---|
| 1 | 16.842 | 4.93 | 1.52538 | 56.3 |
| 2 | 246.997 | 3.44 | | |
| 3 | −31.490 | 1.20 | 1.52538 | 56.3 |
| *4 | 15.878 | 4.07 | | |
| 5 | 42.552 | 2.50 | 1.52538 | 56.3 |
| 6 | −23.841 | | | |

[TABLE 2]

| | First surface | Third surface | Fifth surface |
|---|---|---|---|
| K | 0 | 0 | 0 |
| A4 | −0.260528 × 10$^{-5}$ | 0.993699 × 10$^{-6}$ | 0.870000 × 10$^{-7}$ |
| A6 | 0 | 0.647043 × 10$^{-8}$ | 0 |

Figures 2A, 2B, 2C, 2D, 2E:
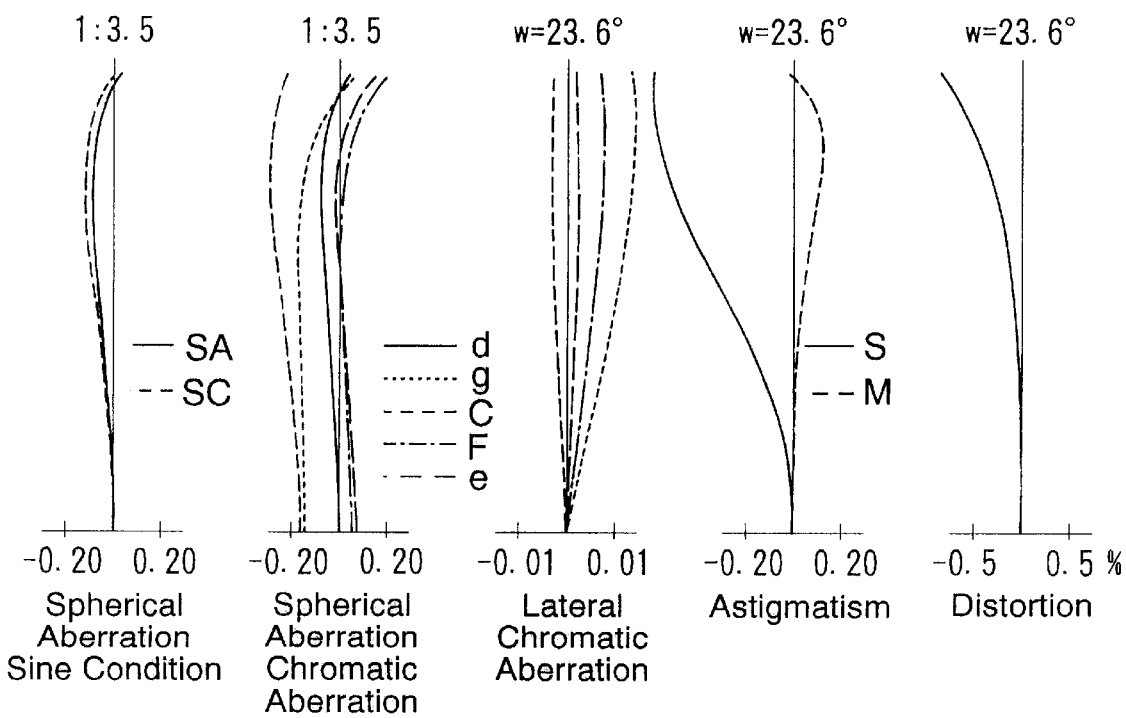
FIGS. 2A–2E show graphs illustrating aberrations produced in the first embodiment of the present invention.

FIGS. 2A–2E show graphs illustrating aberrations in the first embodiment. FIG. 2A shows spherical aberration SA and a sine condition SC, FIG. 2B shows a chromatic aberration which is represented by spherical aberration for the d-line, g-line (436 nm), C-line (656 nm), F-line (486 nm) and e-line (546 nm), FIG. 2C shows the lateral chromatic aberration at the same wavelengths, FIG. 2D shows astigmatism (S: sagittal, M: meridional), and FIG. 2E shows distortion. An abscissa used for representing distortion is sectioned in a unit of percent (%), whereas abscissas used showing the other aberrations are sectioned in a unit of mm.

Second Embodiment

FIG. 3 shows a structure of the second embodiment. Aberration curves of the second embodiment is illustrated in FIGS. 4A–4E. The structure can be known more concretely from numerical data which is listed in Table 3 shown below:

[TABLE 3]

Fno. 1: 4.0 f = 50.00 ω = 23.5° fB = 42.00

| Surface No. | r | d | n | ν |
|---|---|---|---|---|
| *1 | 16.195 | 4.16 | 1.80100 | 35.0 |
| 2 | 23.402 | 3.88 | | |
| 3 | −29.760 | 1.20 | 1.67650 | 37.5 |
| 4 | 17.601 | 1.07 | | |
| 5 | 29.582 | 3.00 | 1.80400 | 46.6 |
| 6 | −26.269 | | | |

Third Embodiment

FIG. 5 is a sectional view illustrating a structure of the third embodiment and FIGS. 6A–6E show aberration curves of the third embodiment. The structure can be known more concretely from numerical data which is summarized in Table 4 shown below:

[TABLE 4]

Fno. 1: 4.0 f = 50.00 ω = 23.6° fB = 38.88

| Surface No. | r | d | n | ν |
|---|---|---|---|---|
| 1 | 18.968 | 6.71 | 1.74100 | 52.7 |
| 2 | 61.644 | 2.16 | | |
| 3 | −51.536 | 1.20 | 1.52538 | 56.3 |
| *4 | 15.639 | 5.06 | | |
| 5 | 59.576 | 1.95 | 1.70000 | 48.1 |
| 6 | −40.133 | | | |

Fourth Embodiment

FIG. 7 is a sectional view illustrating a structure of the fourth embodiment and FIGS. 8A–8E show aberration curves of the fourth embodiment. Numerical data representing the structure more concretely is listed in Table 5 shown below:

[TABLE 5]

Fno. 1: 4.0 f = 50.00 ω = 23.4° fB = 42.55

| Surface No. | r | d | n | ν |
|---|---|---|---|---|
| 1 | 15.758 | 5.12 | 1.77250 | 49.6 |
| 2 | 22.017 | 2.20 | | |
| *3 | −23.262 | 1.20 | 1.54358 | 55.6 |
| 4 | 16.739 | 1.24 | | |
| 5 | 28.720 | 2.30 | 1.63930 | 44.9 |
| 6 | −21.818 | | | |

Fifth Embodiment

Figure 9:
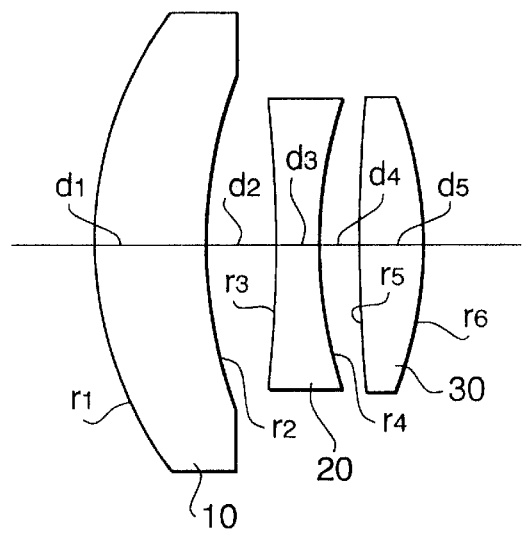
FIG. 9 is a sectional view illustrating a structure of a fifth embodiment of the triplet lens system according to the present invention.
Figures 10A, 10B, 10C, 10D, 10E:
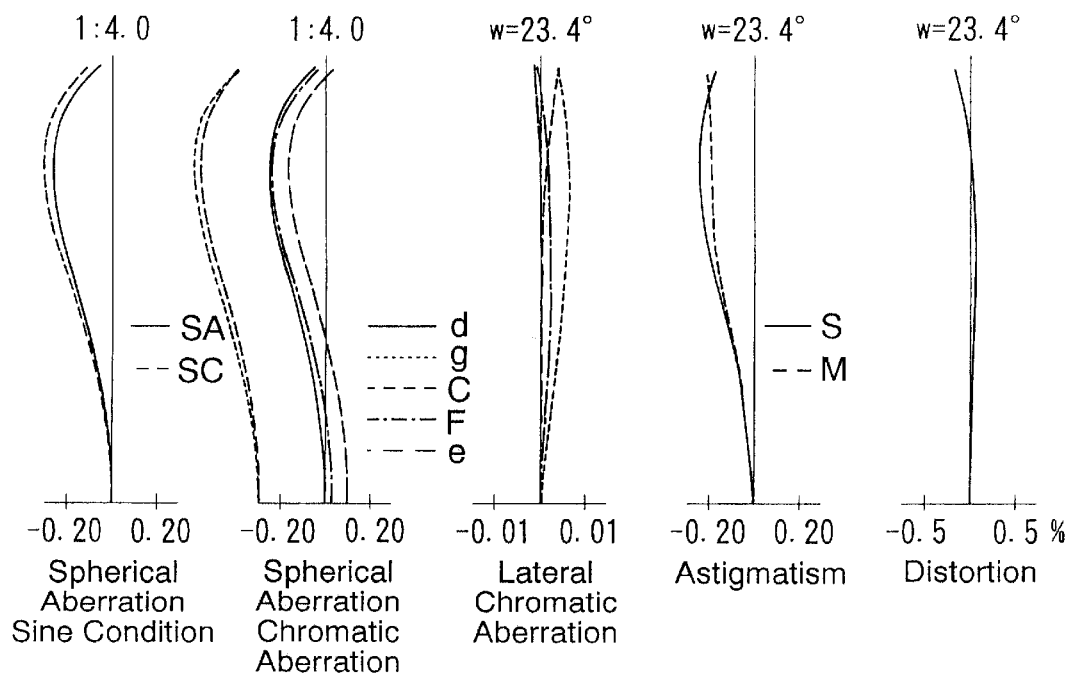
FIGS. 10A–10E show graphs illustrating aberrations produced in the fifth embodiment of the present invention.

FIG. 9 is a sectional view illustrating a structure of fifth embodiment and FIGS. 10A–10E present aberration curves of the fifth embodiment. The structure of the fifth embodiment can be known more concretely from the numerical data listed in Table 6 shown below:

[TABLE 6]

Fno. 1: 4.0 f = 50.00 ω = 23.4° fB = 42.62

| Surface No. | r | d | n | ν |
|---|---|---|---|---|
| 1 | 15.260 | 4.00 | 1.80400 | 46.6 |
| 2 | 21.500 | 2.76 | | |
| *3 | −24.896 | 1.20 | 1.49176 | 57.4 |
| 4 | 15.243 | 1.32 | | |
| 5 | 25.758 | 2.30 | 1.56732 | 42.8 |
| 6 | −22.606 | | | |

Sixth Embodiment

Figure 11:
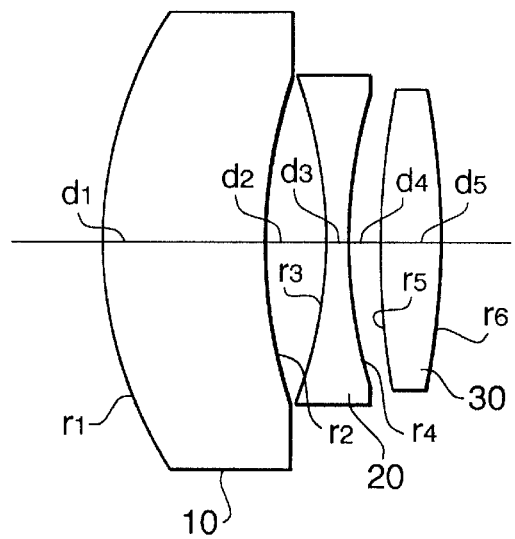
FIG. 11 is a sectional view illustrating a structure of a sixth embodiment of the triplet lens system according to the present invention.
Figures 12A, 12B, 12C, 12D, 12E:
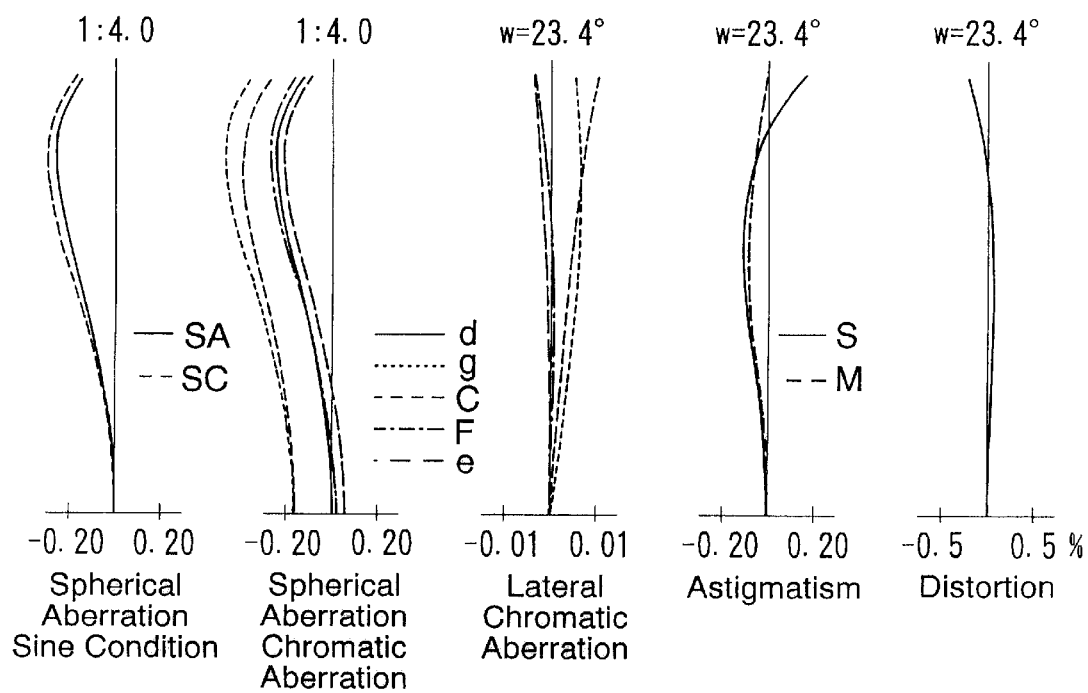
FIGS. 12A–12E show graphs illustrating aberrations produced in the sixth embodiment of the present invention.

FIG. 11 is a sectional view illustrating a structure of the sixth embodiment and FIGS. 12A–12E show aberration curves of the sixth embodiment. More concretely, the sixth embodiment has a structure which is represented by the numerical data summarized in Table 7 shown below:

[TABLE 7]

Fno. 1: 4.0 f = 50.00 ω = 23.4° fB = 42.77

| Surface No. | r | d | n | ν |
|---|---|---|---|---|
| 1 | 15.891 | 5.96 | 1.72000 | 42.0 |
| *2 | 21.663 | 1.74 | | |
| 3 | −24.329 | 1.20 | 1.60562 | 43.7 |
| 4 | 18.759 | 1.24 | | |
| 5 | 35.817 | 2.30 | 1.77250 | 49.6 |
| 6 | −22.867 | | | |

Seventh Embodiment

Figure 13:
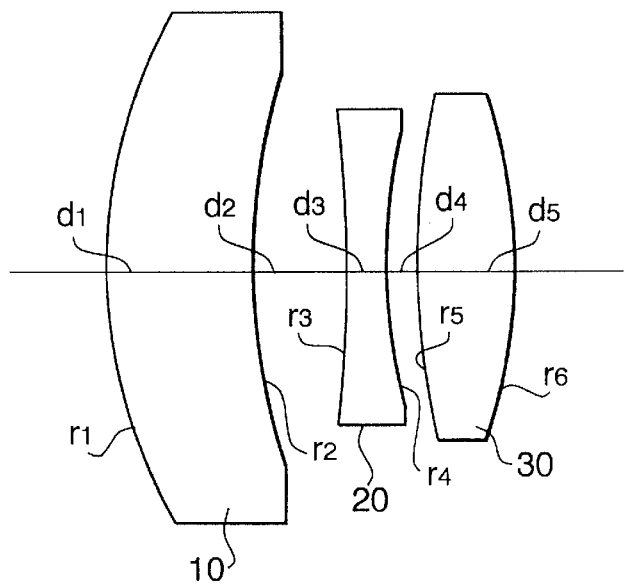
FIG. 13 is a sectional view illustrating a structure of a seventh embodiment of the triplet lens system according to the present invention.
Figures 14A, 14B, 14C, 14D, 14E:
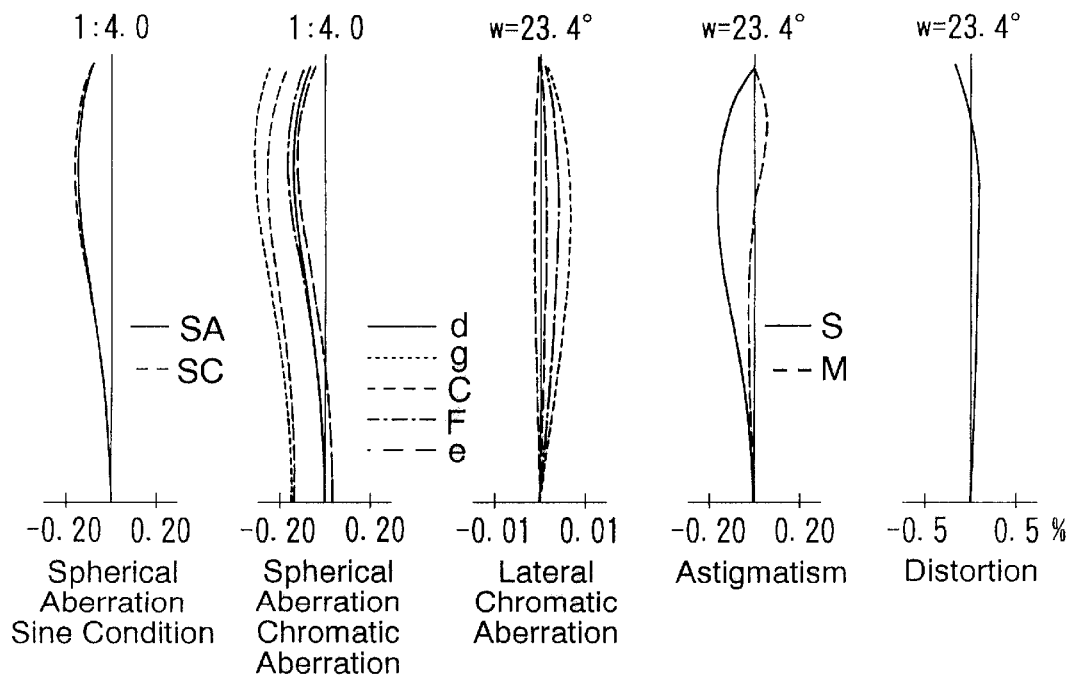
FIGS. 14A–14E show graphs visualizing aberrations produced in the seventh embodiment of the present invention.

FIG. 13 is a sectional view illustrating a structure of the seventh embodiment and FIGS. 14A–14E show aberration curves of this embodiment. The structure of the seventh embodiment can be known more concretely from the numerical data listed in Table 8 shown below:

[TABLE 8]

Fno. 1: 4.0 f = 50.00 ω = 23.4° fB = 40.91

| Surface No. | r | d | n | ν |
|---|---|---|---|---|
| 1 | 17.491 | 5.71 | 1.80400 | 46.6 |
| 2 | 26.109 | 3.70 | | |
| *3 | −30.019 | 1.20 | 1.68893 | 31.1 |
| 4 | 19.627 | 1.26 | | |
| 5 | 33.821 | 3.26 | 1.80100 | 35.0 |
| 6 | −26.445 | | | |

Eighth embodiment

FIG. 15 is a sectional view illustrating a structure of the eighth embodiment and FIGS. 16A–16E show curves visualizing aberrations in the eighth embodiment. The structure of the eighth embodiment is represented more it concretely by the numerical data listed in Table 9 shown below:

[TABLE 9]

Fno. 1: 4.0 F = 50.00 ω = 23.5° fB = 41.59

| Surface No. | r | d | n | ν |
|---|---|---|---|---|
| 1 | 17.154 | 6.00 | 1.77250 | 49.6 |
| 2 | 27.054 | 2.85 | | |
| *3 | −29.318 | 1.20 | 1.68893 | 31.1 |
| 4 | 19.317 | 1.38 | | |
| 5 | 35.912 | 3.08 | 1.80610 | 40.9 |
| 6 | −25.216 | | | |

Ninth Embodiment

Figure 17:
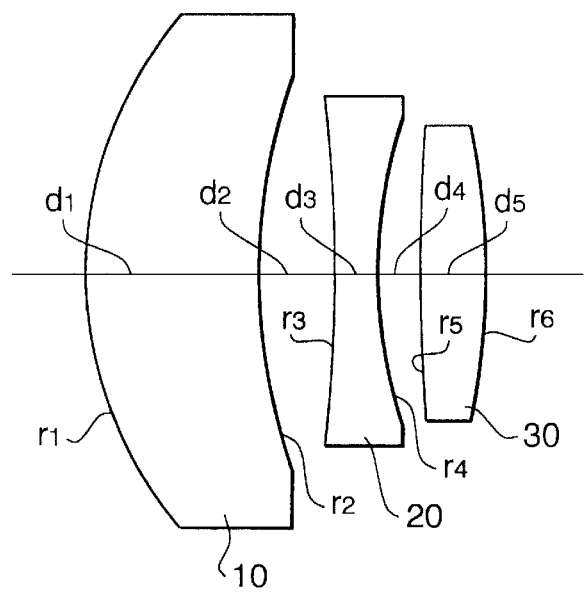
FIG. 17 is a sectional view illustrating a structure of a ninth embodiment of the triplet lens system according to the present invention.
Figures 18A, 18B, 18C, 18D, 18E:
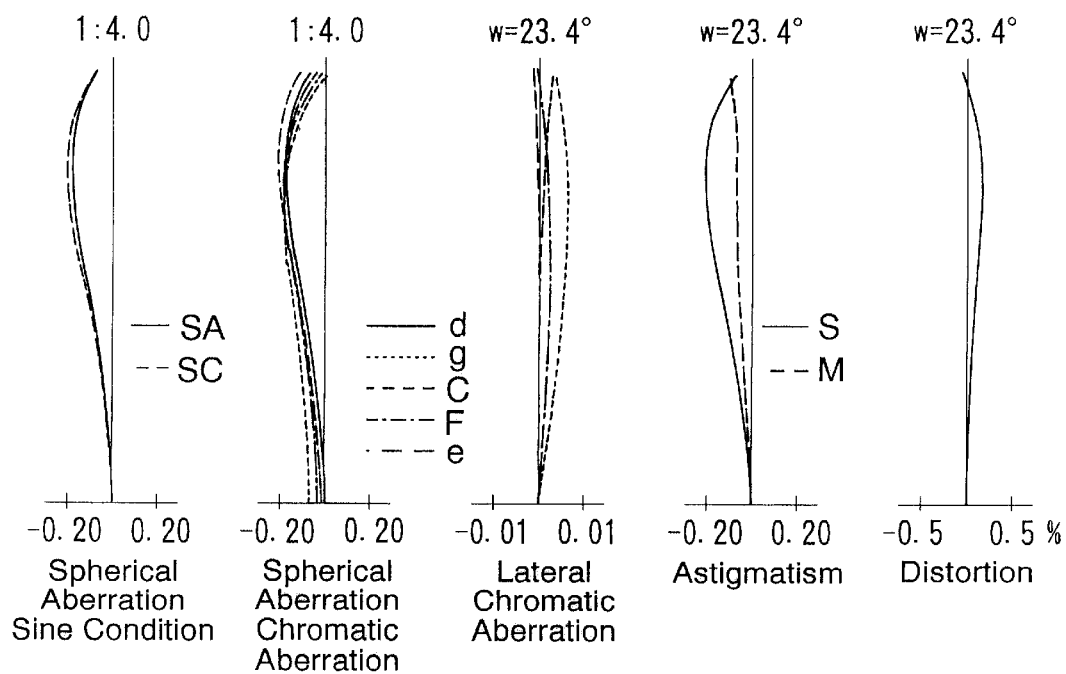
FIGS. 18A–18E show graphs visualizing aberrations produced in the ninth embodiment of the present invention.

FIG. 17 is a sectional view illustrating a structure of the ninth embodiment and FIGS. 18A–18E show curves representing aberrations in the ninth embodiment. The structure of the ninth embodiment is represented more concretely by the numerical data listed in Table 10 below:

[TABLE 10]

Fno. 1: 4.0 f = 50.00 ω = 23.4° fB = 41.26

| Surface No. | r | d | n | ν |
|---|---|---|---|---|
| 1 | 17.257 | 6.00 | 1.77250 | 49.6 |
| *2 | 27.572 | 3.00 | | |

[TABLE 10]-continued

Fno. 1: 4.0 f = 50.00 ω = 23.4° fB = 41.26

| Surface No. | r | d | n | ν |
|---|---|---|---|---|
| 3 | −28.375 | 1.20 | 1.66680 | 33.0 |
| 4 | 18.631 | 1.39 | | |
| 5 | 35.068 | 2.68 | 1.78590 | 44.2 |
| 6 | −24.535 | | | |

The diffractive lens used in each of the embodiment has a zonal structure like a Fresnel fens and its optical path difference is expressed as a function of a height Y above an optical axis. In this expression mode, the lens has a paraxially positive power when a coefficient P2 of a term Y2 is negative. When a coefficient P4 of a term Y4 is positive, a negative power is strengthened toward a marginal portion. An optical path difference added by a diffractive lens is expressed as:

$$\Delta\phi(Y) = (P2Y^2 + P4Y^4 + \ldots) \times 2\pi \text{(rad.)}$$

wherein the reference symbols P2, P4, P6, . . . are coefficients of second, fourth, sixth, . . . orders respectively.

A microscopic shape of an actual lens element is determined so as to have an optical length addition amount $\Delta\phi'$, similar to a Fresnel lens, in which integral times of a wavelength have been subtracted from an optical path length:

$$\Delta\phi'(Y) = (\text{MOD}(P2Y^2 + P4Y^4 + \ldots + \text{Const}, 1) - \text{Const}) \times 2\pi \text{(rad.)}$$

The constant term Const is a constant for setting a phase at a boundary location between rings and has an optional value from 0 to 1. MOD(x, y) is a function giving a remainder which is obtained when x is divided by y. A point of Y at which MOD $(p2Y^2 + P4Y^4 + \ldots + \text{Const}, 1)$ has a value of 0 is a boundary between the rings. Gradients and steps are set so as to have an optical path difference $\Delta\phi'$ (Y) on a base shape. Coefficients of optical path differences in the embodiments are listed in Table 11 shown below:

[TABLE 11]

| | P2 | P4 | P6 |
|---|---|---|---|
| 1st embodiment | −2.123 × 10$^{+00}$ | −2.106 × 10$^{-03}$ | −4.111 × 10$^{-06}$ |
| 2nd embodiment | −1.235 × 10$^{+00}$ | −1.205 × 10$^{-03}$ | 0.000 |
| 3rd embodiment | −2.520 × 10$^{+00}$ | −2.577 × 10$^{-03}$ | −5.220 × 10$^{-06}$ |
| 4th embodiment | −3.034 × 10$^{+00}$ | 6.108 × 10$^{-03}$ | −8.235 × 10$^{-06}$ |
| 5th embodiment | −3.254 × 10$^{+00}$ | 6.448 × 10$^{-03}$ | −7.335 × 10$^{-06}$ |
| 6th embodiment | −1.941 × 10$^{+00}$ | 4.406 × 10$^{-03}$ | −6.888 × 10$^{-06}$ |
| 7th embodiment | −1.839 × 10$^{+00}$ | 8.420 × 10$^{-03}$ | −5.244 × 10$^{-06}$ |
| 8th embodiment | −7.709 × 10$^{-01}$ | 4.656 × 10$^{-03}$ | −2.970 × 10$^{-06}$ |
| 9th embodiment | −6.726 × 10$^{-01}$ | 8.787 × 10$^{-04}$ | −8.682 × 10$^{-07}$ |

A power $\phi D$ of a diffractive lens, which is expressed as $-2 \times P2 \times \lambda$, is 1451 nm$^{-1}$ at a wavelength of 587.56 nm and the focal length fD is 688.7 mm, for example, in the second embodiment.

[TABLE 12]

| | f/fD | ν1 | ν2 | ν3 | d1/f | hD/h1 |
|---|---|---|---|---|---|---|
| 1st embodiment | 0.1247 | 56.3 | 56.3 | 56.3 | 0.0986 | 0.807 |
| 2nd embodiment | 0.0726 | 35.0 | 37.5 | 46.6 | 0.0832 | |
| 3rd embodiment | 0.1481 | 52.7 | 56.3 | 48.1 | 0.1342 | 0.779 |

[TABLE 12]-continued

|  | f/fD | ν1 | ν2 | ν3 | d1/f | hD/h1 |
|---|---|---|---|---|---|---|
| 4th embodiment | 0.1783 | 49.6 | 55.6 | 44.9 | 0.1024 | 0.848 |
| 5th embodiment | 0.1912 | 46.6 | 57.4 | 42.8 | 0.0800 | 0.862 |
| 6th embodiment | 0.1140 | 42.0 | 43.7 | 49.6 | 0.1192 |  |
| 7th embodiment | 0.1080 | 46.6 | 31.1 | 35.0 | 0.1142 |  |
| 8th embodiment | 0.0453 | 49.6 | 31.1 | 40.9 | 0.1200 |  |
| 9th embodiment | 0.0395 | 49.6 | 33.3 | 44.2 | 0.1200 |  |

The component of the fourth order has a positive power in each of the first, second and third embodiments, whereas the component of the fourth order has a negative power in each of the other embodiments. The spherical aberration curves have a uniform shape in the embodiments wherein the component of the fourth order is negative.

As understood from the foregoing description, the present invention allows a Petzval's sum to become nearly zero by forming a diffractive lens on a surface of three lens elements used for composing a triplet lens system, thereby making it possible to arrange meridional and sagittal image planes at a location on an optical axis for obtaining an optimum image plane without producing remarkable astigmatism, allow image plane to be tilted due to manufacturing errors, moderate focusing precision and use the triplet lens system in optical instruments which require high resolution.

In particular, it is desirable that the diffractive lens has a power ratio which satisfies the following condition:

$$0.03 < (f/fD) < 0.25$$

wherein the reference symbol f represents a focal length of a triplet lens system as whole, and a reference symbol fD designates a focal length of the diffractive lens. As indicated in Table 12, the above condition is satisfied in the embodiments.

In the first, third, fourth and fifth embodiments, the second lens is made of resin, and the diffractive lens is formed on the second lens. In this case, the lower limit in the above condition could be 0.07. That is, $$0.07 < (f/fD) < 0.25.$$

The present disclosure relates to subject matter contained in Japanese patent Application No. HEI 8-300947, filed on Oct. 24, 1996, which is expressly incorporated herein by reference in its entirety.

What is claimed is:

1. A triplet lens system, comprising:

a first, positive lens element;

a second, negative lens element; and a third, positive lens element, wherein at least one surface from among said first lens element, said second lens element or said third lens element is provided with a blazed zonal structure having a function of a positive diffractive lens, said zonal structure being formed on a surface of said second lens element which faces said third lens element, and wherein said second lens element is made of a resin, and the triplet lens system satisfying the following condition:

$$\nu2 \leq \nu1 \leq \nu3,$$

wherein ν1 represents an Abbe's number of said first lens element, ν2 represents an Abbe's number of said second lens element, and ν3 represents an Abbe's number of said third lens element.

2. The triplet lens system according to claim 1, said blazed zonal structure being configured to make a Petzval's sum approximately equal to zero.

3. A triplet lens system, comprising a first, positive lens element;

a second, negative lens element; and a third, positive lens element, wherein at least one surface from among said first lens element, said second lens element or said third lens element is provided with a blazed zonal structure having a function of a positive diffractive lens, said zonal structure being formed on a surface of said second lens element which faces said third lens element, and wherein said second lens element is made of a resin, the triplet lens system satisfying the following condition:

$$0.75 < hD/h1 < 0.88$$

wherein h1 represents a height of incidence of a paraxial marginal ray on said first lens element, and hD represents a height of said paraxial marginal ray on said surface on which said zonal structure is formed.

4. The triplet lens system according to claim 3, said blazed zonal structure being configured to make a Petzval's sum approximately equal to zero.

5. A triplet lens system, comprising a first, positive lens element;

a second, negative lens element; and a third, positive lens element, wherein at least one surface from among said first lens element, said second lens element or said third lens element is provided with a blazed zonal structure having a function of a positive diffractive lens, said zonal structure being formed on a surface of said second lens element which faces said first lens element, and wherein said second lens element is made of a resin, and the triplet lens system satisfying the following condition:

$$\nu2 \leq \nu1 > \nu3,$$

wherein reference symbol ν1 represents an Abbe's number of said first lens element, reference symbol ν2 represents an Abbe's number of said second lens element, and reference symbol ν3 represents an Abbe's number of said third lens element.

6. The triplet lens system according to claim 5, said blazed zonal structure being configured to make a Petzval's sum approximately equal to zero.

7. A triplet lens system, comprising:

a first, positive lens element;

a second, negative lens element; and a third, positive lens element, wherein at least one surface from among said first lens element, said second lens element or said third lens element is provided with a blazed zonal structure having a function of a positive diffractive lens, said zonal structure being formed on a surface of said second lens element which faces said first lens element, and wherein said second lens element is made of a resin, and the triplet lens system satisfying the following condition:

$0.75 < hD/h1 < 0.88$, where h1 represents a height of incidence of a paraxial marginal ray on said first lens element, and hD represents a height of said paraxial marginal ray on said surface on which said zonal structure is formed.

8. The triplet lens system according to claim 7, said blazed zonal structure being configured to make a Petzval's sum approximately equal to zero.

* * * * *